(12) United States Patent
Ogino et al.

(10) Patent No.: US 8,535,613 B2
(45) Date of Patent: Sep. 17, 2013

(54) METHOD AND APPARATUS FOR SEPARATING ACIDIC GASES FROM SYNGAS

(75) Inventors: Shinji Ogino, Mihara (JP); Fumiaki Sato, Mihara (JP); Yudai Kato, Mihara (JP); Motonari Aihara, Mihara (JP); Kazuo Ishida, Yokohama (JP); Seiji Kakesako, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 195 days.

(21) Appl. No.: 12/604,142

(22) Filed: Oct. 22, 2009

(65) Prior Publication Data

US 2010/0276640 A1 Nov. 4, 2010

(30) Foreign Application Priority Data

Apr. 30, 2009 (JP) .................................. 2009-110596

(51) Int. Cl.
*C01B 3/52* (2006.01)
*B01D 53/52* (2006.01)
*B01D 53/62* (2006.01)

(52) U.S. Cl.
USPC ............... 422/187; 48/128; 96/234; 422/611; 422/626

(58) Field of Classification Search
USPC .................. 48/128; 422/187, 609, 611, 612, 422/626; 423/226, 228, 232; 96/234
See application file for complete search history.

(56) References Cited

U.S. PATENT DOCUMENTS

| | | | | |
|---|---|---|---|---|
| 3,120,993 A | * | 2/1964 | Thormann et al. | 423/563 |
| 3,767,766 A | * | 10/1973 | Tjoa et al. | 423/226 |
| 4,347,227 A | * | 8/1982 | Hass et al. | 423/235 |
| 4,891,187 A | * | 1/1990 | Jungfer et al. | 423/248 |
| 6,702,936 B2 | * | 3/2004 | Rettger et al. | 208/86 |
| 2006/0156923 A1 | | 7/2006 | Meckl et al. | |
| 2006/0228284 A1 | * | 10/2006 | Schmidt | 423/352 |

FOREIGN PATENT DOCUMENTS

| | | |
|---|---|---|
| EP | 0 013 049 A1 | 7/1980 |
| EP | 0413199 A1 | 2/1991 |
| JP | 10-314537 A | 12/1998 |
| WO | 01/56922 A1 | 8/2001 |
| WO | 2008-103467 A1 | 8/2008 |

OTHER PUBLICATIONS

European Search Report dated Oct. 15, 2010, issued in corresponding European Patent Application No. 09175921.7.

(Continued)

*Primary Examiner* — Jill Warden
*Assistant Examiner* — Joye L Woodard
(74) *Attorney, Agent, or Firm* — Westerman Hattori Daniels & Adrian, LLP

(57) ABSTRACT

A method and an apparatus for separating acidic gases from syngas are capable of reducing the necessary power and are capable of obtaining high-purity $CO_2$ at a high recovery ratio. A purification method and a purification system of coal gasification gas using the method and the apparatus are also provided.

An apparatus for separating acidic gases from syngas containing acidic gases of $CO_2$ and $H_2S$, in order, converts CO in the syngas into $CO_2$, removes $H_2S$ contained in the syngas by using a solvent for physical absorption, removes physical solvent from the syngas followed by heating in a heat exchanger using the converted syngas heat, and removes $CO_2$ from the heated syngas by using a solvent for chemical absorption.

4 Claims, 4 Drawing Sheets

(56) References Cited

OTHER PUBLICATIONS

Hiller, Heinz et al.; "Gas Production"; Internet Citation, Dec. 15, 2006, pp. 1-31; XP002565603.
Hiller, Heinz et al.; "Gas Production" Internet Ullmanns Encyclopedia of Industrial Chemistry; Dec. 15, 2006, pp. 1, 90-118, 162, 163, XP002595382.
Richterova, V. et al.; "The Possibility of Hydrogen Production Improvement"; Energy Conversion and Management, vol. 25, No. 3, Jan. 1, 1985, pp. 361-364.
European Office Action dated Nov. 25, 2011, issued in corresponding European Patent Application No. 09175921.7.
Japanese Office Action dated Oct. 14, 2011, issued in corresponding Japanese Patent Application No. 2009-110596.
Notice of Allowance dated Apr. 24, 2013 in corresponding Canadian Application No. 2,683,094.
Notice of Allowance dated Jul. 10, 2013, issued in corresponding European Patent application No. 09175921.7.

* cited by examiner ized by the same solvent;
however, the physical absorption process has a problem that
METHOD AND APPARATUS FOR SEPARATING ACIDIC GASES FROM SYNGAS

BACKGROUND OF THE INVENTION

The present invention relates to a method and an apparatus for separating acidic gases from syngas.

The composition of the conventional crude gas produced by coal gasification includes hydrogen ($H_2$), carbon monoxide (CO), and carbon dioxide ($CO_2$) as the main components, and also includes nitrogen ($N_2$), methane ($CH_4$), hydrogen sulfide ($H_2S$), and the like. When $CO_2$ is removed from such a syngas to recover $CO_2$ therefrom, first, CO in the crude gas needs to be converted into $H_2$ and $CO_2$ by a reaction with steam (shift reaction). In addition, when the gas after purification is used as a raw material for chemicals such as ammonia or as a fuel for power generation, acidic gases such as $H_2S$ need to be removed from the crude gas.

When CO shift reaction is performed without the removal of $H_2S$ from crude gas, the gas after the shift reaction contains both $CO_2$ and $H_2S$, each of which then needs to be separated and recovered individually. Conventionally, in this separation process, a physical absorption process in which $H_2S$ is selectively dissolved in a solvent is employed first to separate $CO_2$ and $H_2S$ from each other. FIG. 1 shows the configuration of an apparatus employing a typical physical absorption process for separating acidic gases from crude syngas.

FIG. 1 is a plan view showing the schematic configuration of $H_2S$ removal means and $CO_2$ removal means in one embodiment of a conventional acidic gas separation apparatus using a physical absorption process. As shown in FIG. 1, shifted gas after the CO shift reaction is introduced into an acidic gas absorption tower 101, and brought into contact with a solvent fed by a pump 102d. As a result, $H_2S$ is removed. The solvent having absorbed $H_2S$ in the crude gas in the acidic gas absorption tower 101 is introduced into an acidic gas stripping tower 106 through an acidic gas concentrating tower 104. In the acidic gas stripping tower 106, the absorbed acidic gas is stripped from the solvent by heating with a reboiler 109. The stripped acidic gas is exhausted as acidic gas after passing through a condenser 107. On the other hand, the solvent from which the acidic gas has been stripped is introduced into a $CO_2$ absorption tower 111 through a pump 102b, a heat exchanger 103, and a cooler 110a.

The crude gas from which $H_2S$ has been removed in the acidic gas absorption tower 101 is introduced into the $CO_2$ absorption tower 111, and again brought into contact with the solvent. As a result, $CO_2$ is removed. The purified gas after the $CO_2$ removal is used as a fuel for power generation, a raw material for chemical synthesis, or the like. The solvent having absorbed $CO_2$ is separated into gas components and the solvent in flash drums 112a, 112b, and 112c. The gas components from the flash drum 112a are returned to the $CO_2$ absorption tower 111, whereas the gas components from the flash drums 112b and 112c are exhausted as $CO_2$. The solvent from which the gas has been released returns to the $CO_2$ absorption tower 111 through a pump 112e and a chiller 110c, and is reused in the $CO_2$ absorption tower 111.

As described above, the conventional acidic gas separation method using physical absorption is a method in which the crude gas after the coal gasification is washed with a solvent to thereby remove $H_2S$, and the crude gas after the $H_2S$ removal is supplied into the $CO_2$ absorption tower, where the solvent again removes $CO_2$.

The physical absorption process is characterized that $H_2S$ and $CO_2$ are separated and recovered by the same solvent; however, the physical absorption process has a problem that the solvent needs to be cooled to a low temperature by a chiller, and hence power required by the chiller is extremely large.

Furthermore, the method is advantageous in requiring no heat to strip $CO_2$ from the solvent having absorbed $CO_2$, and in that 90% or more of carbon out of the total carbon (CO+$CO_2$+$CH_4$) after coal gasification can be recovered as $CO_2$ by lowering the pressure. On the other hand, the method has a problem that the purity of the recovered $CO_2$ is low when compared with that obtained in the case of a chemical absorption process to be described later. This is because $CO_2$ is dissolved in proportion to the $CO_2$ partial pressure in the crude gas, and CO, $H_2$ and the like dissolved along with $CO_2$ are stripped simultaneously in the striping of $CO_2$.

On the other hand, unlike the physical absorption process, the chemical absorption process using a solvent containing an organic amine or the like is not capable of separating and recovering $H_2S$ and $CO_2$ individually from crude gas after the CO shift reaction. For this reason, it is necessary to first separate $H_2S$ before the CO shift reaction, that is, under a condition in which the $CO_2$ partial pressure in the crude gas is low, then to perform the CO shift reaction, and then to remove $CO_2$ by chemical absorption.

FIG. 2 is a plan view showing the schematic configuration of $H_2S$ removal means and $CO_2$ removal means in one embodiment of a conventional acidic gas separation apparatus using a chemical absorption process. As shown in FIG. 2, crude gas having been subjected to dust removal with a scrubber is introduced into an acidic gas absorption tower 201, where $H_2S$ in the crude gas is separated and removed. The solvent used for the removal of the acidic gas is introduced into an acidic gas stripping tower 204, through a pump 202a and a heat exchanger 203a. The acidic gas is stripped from the solvent by heating with a reboiler 207a in an acidic gas stripping tower 204, and is exhausted through a condenser 205a. On the other hand, the solvent from which the acidic gas has been stripped is supplied into the acidic gas absorption tower 201, and is reused. The crude gas from which the acidic gas has been removed in the acidic gas absorption tower 201 is introduced into a shift reactor 7, where CO in the gas is converted into $CO_2$ by the shift reaction. Next, the crude gas after the shift reaction is introduced into a $CO_2$ absorption tower, where $CO_2$ is separated and removed. Thereafter, the gas is exhausted as purified gas. From the solvent having absorbed $CO_2$ in the $CO_2$ absorption tower 208, CO, $H_2$, and the like dissolved in the solvent are stripped by flash in a high pressure flash drum 209, and then the solvent is introduced into a $CO_2$ stripping tower 210. CO, $H_2$, and the like stripped in the high pressure flash drum 209 join, after passing through a compressor 213, the crude gas after the shift reaction, and is introduced again into the $CO_2$ absorption tower 208. $CO_2$ stripped from the solvent in the $CO_2$ stripping tower is exhausted through a condenser 205b. Most of the solvent from which $CO_2$ has been stripped is returned to the $CO_2$ absorption tower 208 through a pump 202d. The rest of the solvent is introduced into a solvent regeneration tower 211 through a pump 202e and a heat exchanger 212a. The solvent regenerated in the solvent regeneration tower 211 is returned to the $CO_2$ absorption tower 208, and is reused. The $CO_2$ stripping tower 210 and the solvent regeneration tower 211 are generally formed as an integrated tower.

In such a chemical absorption process, when $H_2S$ is removed in the acidic gas absorption tower 201, $CO_2$ is also removed and eventually exhausted outside the system. Accordingly, when a low grade coal is used as a raw material, the $CO_2$ partial pressure in the crude gas becomes high, which results in a significant $CO_2$ loss in the $H_2S$ removal step.

Accordingly, there is a problem that, in the $CO_2$ recovery step in the downstream, recovery ratio of carbon does not reach 90% or more of total carbon. However, when compared to the physical absorption process, the chemical absorption process is advantageous in that the necessary power is low, and in that the purity of the recovered $CO_2$ is high because $CO_2$ is absorbed by a chemical reaction.

U.S. Patent Application Publication No. 2006/0156923 discloses a configuration for separating acidic gas by such a chemical absorption process.

SUMMARY OF THE INVENTION

In view of the above problems, the present invention provides a method and an apparatus for separating acidic gases from syngas, both being capable of reducing the necessary power, and capable of obtaining high-purity $CO_2$ at a high recovery ratio.

To achieve the above object, an aspect of the present invention provides an apparatus for separating acidic gases of $CO_2$ and $H_2S$ from syngas containing the acidic gases, the apparatus comprising: shift reaction means for converting CO in the syngas into $CO_2$; physical absorption means for removing, by using a solvent of physical absorption, $H_2S$ contained in the syngas after the shift reaction; and chemical absorption means for removing, by using a solvent of chemical absorption, $CO_2$ from the syngas from which $H_2S$ has been removed by the physical absorption means.

Also, the apparatus of the present invention may further comprise solvent removal means for removing the solvent of physical absorption from the syngas from which $H_2S$ is removed by the physical absorption means, the solvent removal means being provided upstream of the chemical absorption means.

Also, the apparatus of the present invention may further comprise heat exchange means for heating the syngas after the solvent removal and before the introduction into the chemical absorption means or circulating water used in the solvent absorbing means, by use of the syngas before the introduction into the physical absorption means and after the shift reaction.

Also, the apparatus of the present invention may further comprise washing means for washing the syngas after the shift reaction, the washing means being provided upstream of the physical absorption means.

Also, in the apparatus of the present invention, the solvent of physical absorption may be a solvent containing a mixture solution of dimethyl ether and a polyethylene glycols, and the solvent of chemical absorption may be a solvent containing an alkylamine.

Also, another aspect of the present invention provides a system for purifying coal gasification gas, the system comprising: a gasifier for producing syngas from coal; a scrubber for removing a hazardous substance in the syngas; and the aforementioned separation apparatus for separating acidic gases from the syngas after the removal of the hazardous substance.

Also, still another aspect of the present invention provides a method for separating acidic gases from syngas containing acidic gases of $CO_2$, and $H_2S$, the method comprising: a shift reaction step of converting CO in the syngas into $CO_2$; a physical absorption step of removing, by using a solvent of physical absorption, $H_2S$ contained in the syngas after the shift reaction; and a chemical absorption step of removing, by using a solvent of chemical absorption, $CO_2$ from the syngas from which $H_2S$ has been removed in the physical absorption step.

Also, the method of the present invention may further comprise a solvent removal step of removing, before the chemical absorption step, the solvent of physical absorption from the syngas from which $H_2S$ is removed in the physical absorption step.

Also, the method of the present invention may further comprise a heating step of heating the syngas after the solvent removal and before the chemical absorption step or circulating water used in the solvent removal step, by use of the syngas before the physical absorption step and after the shift reaction.

Also, the method of the present invention may further include, before the physical absorption step, a washing step of washing the syngas after the shift reaction.

Also, in the method of the present invention, the solvent of physical absorption may be a solvent containing a mixture solution of dimethyl ether and a polyethylene glycols, and the solvent of chemical absorption may be a solvent containing an alkylamine.

Also, yet another aspect of the present invention provides a method for purifying coal gasification gas, the method comprising: a gasification step for producing syngas from coal; a dust removal step for removing a hazardous substance in the syngas in a scrubber; and a separation step by the aforementioned separation method for separating acidic gases from the syngas after the removal of the hazardous substance.

The present invention makes it possible to remove, by using a solvent of physical absorption, $H_2S$ separately from $CO_2$, thereby reduces $CO_2$ accompanying the $H_2S$ removal, and achieves a carbon recovery ratio of 90%. Also, since $CO_2$ in crude gas after the $H_2S$ removal is absorbed by a solvent by chemical absorption, high-purity $CO_2$ can be recovered.

Also, according to the present invention, a solvent of chemical absorption is used as $CO_2$ removal means, thereby making it possible to eliminate the need for a chiller for cooling the solvent to a low temperature, and also to reduce the compressor power to a large extent. Also, according to the present invention, the use of a sour shift reactor containing sulfur makes it possible to reduce steam supplied from the outside, when compared with a sweet shift reactor, which is provided upstream of the $CO_2$ chemical absorption process, and which contains almost no sulfur.

DETAILED DESCRIPTION OF THE INVENTION

An embodiment of the present invention will be described in detail hereinbelow with reference to the drawings.

Figure 1:
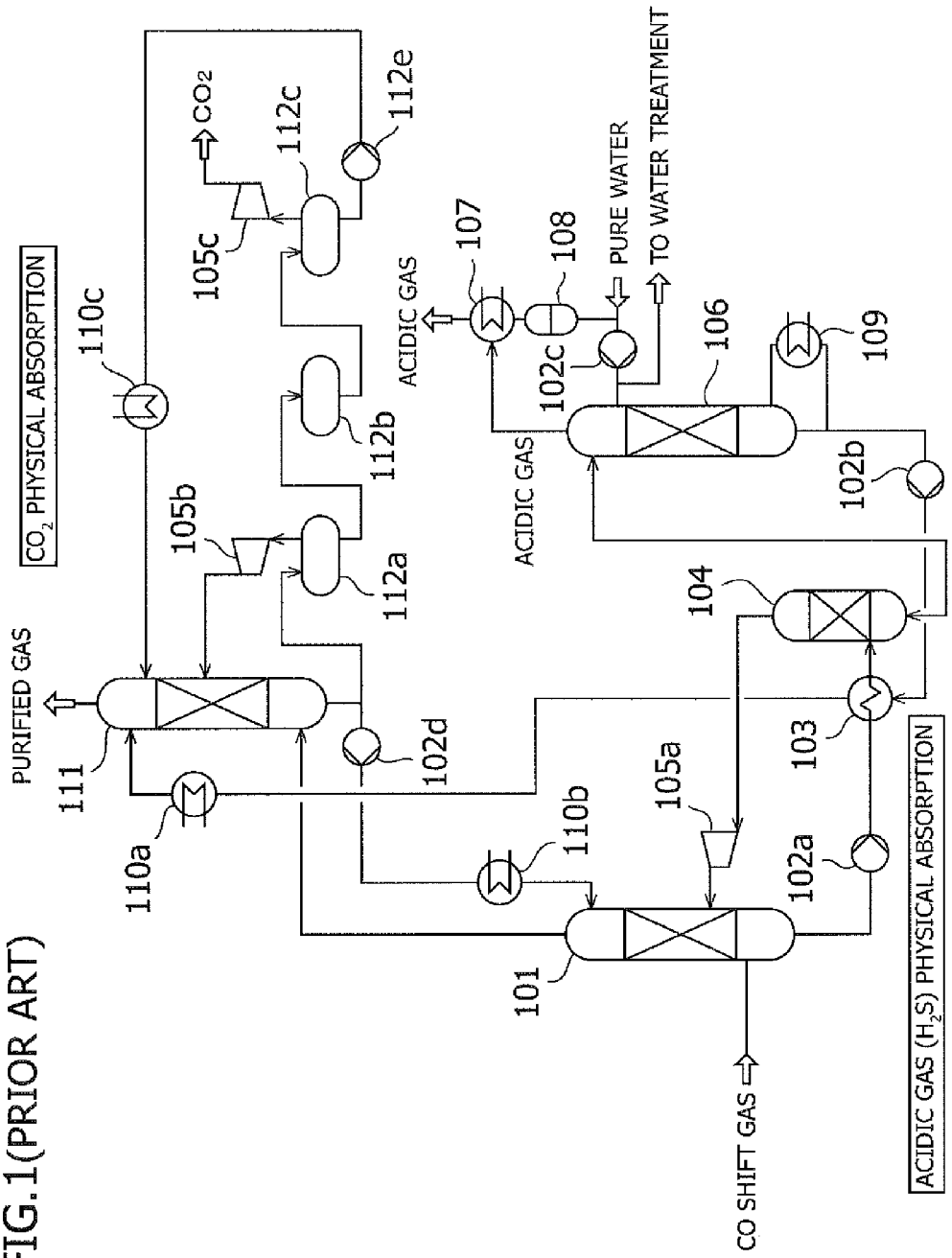
FIG. 1 is a plan view showing the schematic configuration of $H_2S$ removal means and $CO_2$ removal means in one embodiment of a conventional acidic gas separation apparatus using a physical absorption process.
Figure 2:
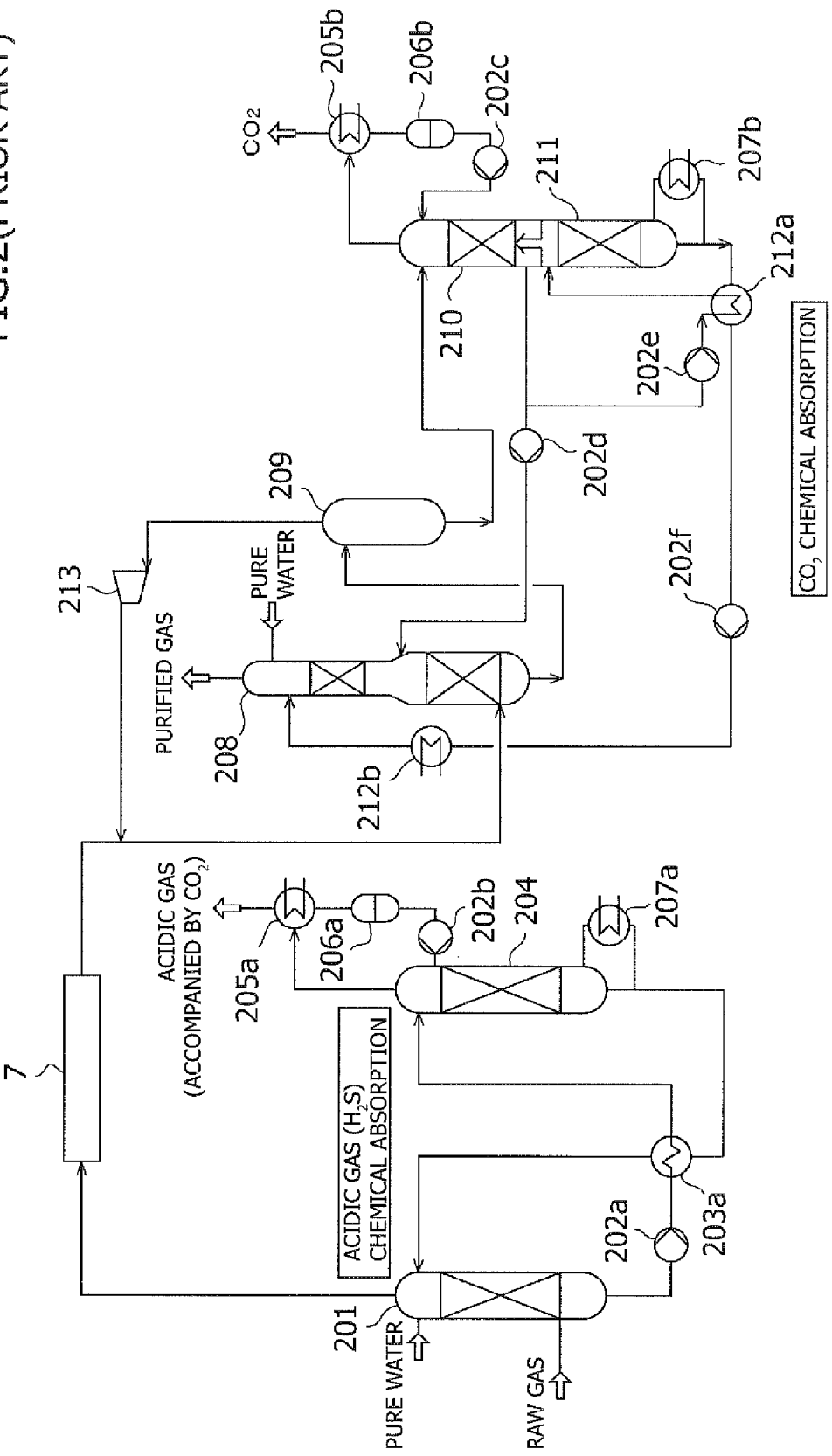
FIG. 2 is a plan view showing the schematic configuration of $H_2S$ removal means and $CO_2$ removal means in one embodiment of a conventional acidic gas separation apparatus using a chemical absorption process.
Figure 3:
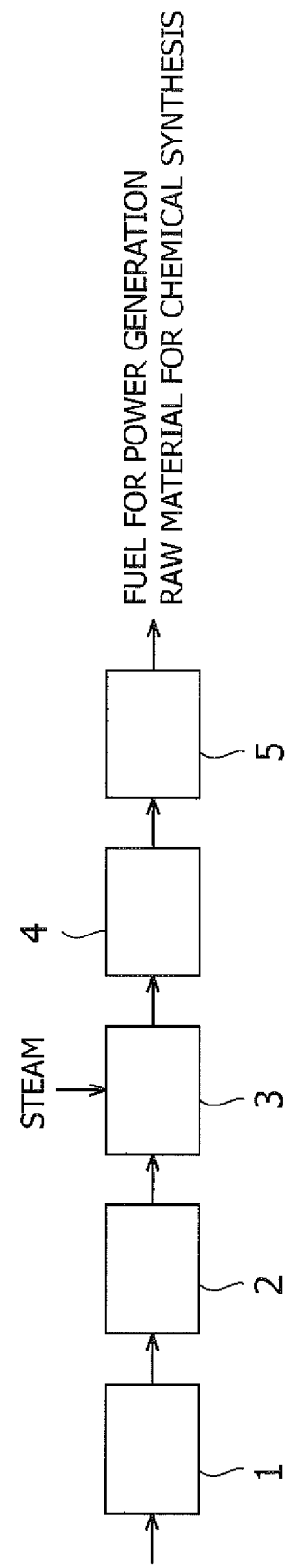
FIG. 3 is a block diagram showing an apparatus for separating acidic gases from syngas, according to the present invention.

FIG. 3 is a block diagram showing an apparatus for separating acidic gases from syngas, according to the present invention. As shown in FIG. 3, the acidic gas separation apparatus of the present invention comprises a gasifier 1, a scrubber 2, a CO shift reactor 3, $H_2S$ removal means 4, and $CO_2$ removal means 5.

As the coal gasifier 1, a general coal gasifier developed by Mitsubishi Heavy Industries, Ltd., Royal Dutch Shell plc, Chevron Corporation, or the like can be used. In such a coal gasifier, crude gas mainly containing carbon monoxide and hydrogen is produced.

As the scrubber 2, any conventionally known scrubber can be employed which can remove dust and hazardous substances in crude gas, such as mercury, heavy metals, and halogens, by bringing the crude gas into contact with a liquid to transfer the hazardous substances to the liquid. For example, a spray tower, a packed tower, a cyclone scrubber, a jet scrubber, a rotary washer, a venturi scrubber, or the like can be used as the scrubber 2. The crude gas from which hazardous substances have been removed in the scrubber 2 is sent to the CO shift reactor 3.

In the CO shift reactor 3 used in the present invention, CO in the crude gas is reacted with $H_2O$ to cause a shift reaction producing $H_2$ and $CO_2$ ($H_2O+CO \rightarrow H_2+CO_2$). For example, a CO shift reactor performing the shift reaction at 230° C. to 480° C. is preferable. Also, in the shift reaction, in order to prevent the deposition of carbon from carbon monoxide contained in the gas ($2CO \rightarrow C+CO_2$), it is preferable to supply an excess amount of process steam ($H_2O$) at an inlet of the shift reactor 3.

Also, as the CO shift reactor 3 used in the present invention, a sulfur-containing (sour) shift reactor using a catalyst based on Co/Mo or the like can be employed because the crude gas to be subjected to the shift reaction contains $H_2S$ of at least 100 ppm or more. In contrast, a catalyst based on Fe or the like is used for a shift reactor (sweet) used when the conventional chemical absorption process is employed, since the crude gas contains almost no $H_2S$. Shift reaction catalysts containing sulfur, such as Co/Mo-based catalysts, are more active than shift reaction catalysts containing almost no sulfur, such as Fe-based catalysts. Accordingly, steam supplied to the crude gas from the outside can be reduced.

Figure 4:
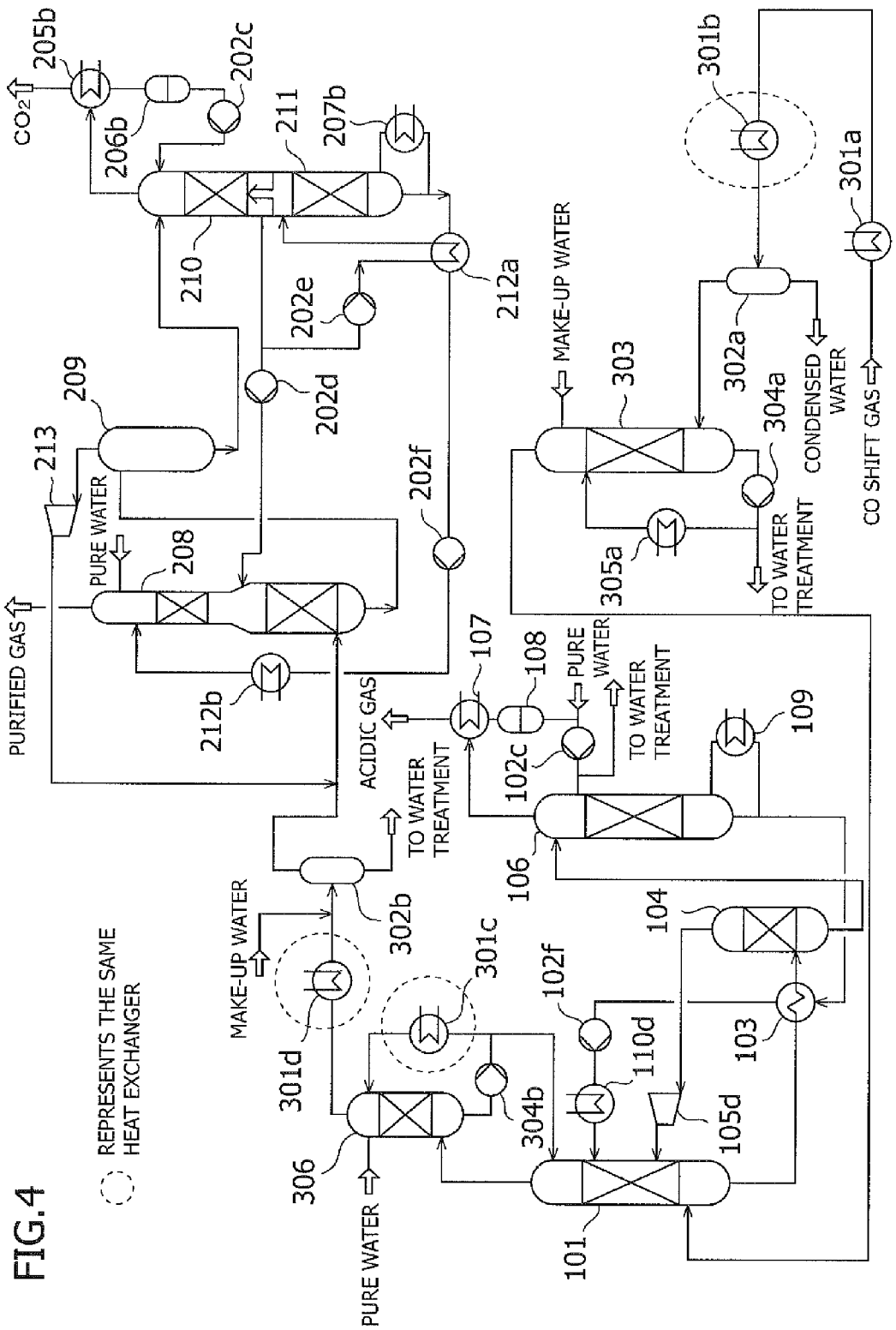
FIG. 4 is a schematic plan view showing the configuration of the apparatus for separating acidic gases from syngas in one embodiment of the present invention, and specifically shows a part after a shift reactor.

Hereinbelow, detailed descriptions will be given of the $H_2S$ removal means 4 and the $CO_2$ removal means 5 with reference to FIG. 4. FIG. 4 is a schematic plan view showing the configuration of the apparatus for separating acidic gases from syngas in one embodiment of the present invention, and specifically shows a part after the shift reactor.

As shown in FIG. 4, the apparatus for separating acidic gases from syngas of the present invention mainly comprises: a washing tower 303 for washing trace amounts of ammonia and hydrocarbons in crude gas after the shift reaction; an acidic gas absorption tower 101 for removing $H_2S$ in the crude gas by using a solvent; an acidic gas concentrating tower 104 for concentrating $H_2S$ absorbed in the solvent; an acidic gas stripping tower 106 for stripping $H_2S$ in the solvent; a solvent absorption tower 306 for removing the solvent contained in the purified gas exhausted from the acidic gas absorption tower 101; a $CO_2$ absorption tower 208 for removing $CO_2$ from gas having passed through the solvent absorption tower 306 by using a solvent; a high pressure flash drum 209 for stripping gases, such as $H_2$ and CO, absorbed in the solvent; a $CO_2$ stripping tower 210 for stripping $CO_2$ in the solvent; and a solvent regeneration tower 211 for regenerating the solvent used for the $CO_2$ absorption. The $CO_2$ stripping tower 210 and the solvent regeneration tower 211 are generally formed as an integrated tower.

According to the embodiment of the present invention, crude gas having undergone the shift reaction in the shift reactor is cooled by heat exchangers 301a and 301b, and is introduced into a flash drum 302a. The crude gas exhausted from the shift reactor has a pressure of about 20 atm to 50 atm, and a temperature of about 270° C. to 450° C., and is cooled by the heat exchangers 301a and 301b. The temperature of the crude gas after being cooled by the heat exchanger 301a is preferably 125° C. to 135° C. The temperature of the crude gas after being cooled by the heat exchanger 301b is preferably 70° C. to 100° C.

Also, since the crude gas exhausted from the shift reactor is humidified by steam, the flash drum 302a removes water in the crude gas cooled by the heat exchangers. The crude gas from which water has been removed by the flash drum 302a is next introduced into the washing tower 303.

The washing tower 303 removes trace amounts of ammonia and hydrocarbons in the crude gas. To the upper part of the washing tower 303, piping for supplying make-up water as needed is connected. The make-up water is supplied into the washing tower 303 through the piping. Drain water is discharged from the bottom of the washing tower 303, and the drain water is circulated by a pump 304a to the washing tower 303 through a cooler 305a. Alternatively, the drain water is not circulated but may be directly subjected to water treatment. The crude gas from which ammonia and hydrocarbons have been removed is exhausted from the top of the washing tower 303, and introduced into the acidic gas absorption tower 101.

The acidic gas absorption tower 101 separates and removes acidic gases, particularly $H_2S$, in the crude gas by a physical absorption process. A solvent is supplied into the acidic gas absorption tower 101, and absorbs acidic gas in the crude gas. The crude gas from which acidic gases have been removed is exhausted from the top of the acidic gas absorption tower 101, and is introduced into the solvent absorption tower 306. The solvent after the acidic gas absorption is discharged from the bottom of the acidic gas absorption tower 101, and is heated in a heat exchanger 103 by the solvent regenerated by the acidic gas stripping tower 106. The solvent is then introduced into the acidic gas concentrating tower 104.

As the solvent used in the acidic gas absorption tower 101, a solvent of physical absorption, such as a mixture solution of diethyl ether and a polyethylene glycols, can be used. Also, the temperature of the crude gas in the acidic gas absorption tower 101 is preferably 20° C. to 40° C.

The acidic gas concentrating tower 104 strips, by flash, $H_2$, CO, $CO_2$ or the like dissolved in the solvent. $H_2$, CO, $CO_2$ or the like stripped in the acidic gas concentrating tower 104 can be introduced again into the acidic gas absorption tower 101 through a compressor 105d. The solvent is exhausted from the bottom of the acidic gas concentrating tower 104, and is next introduced into the acidic gas stripping tower 106.

In the acidic gas stripping tower 106, acidic gases, particularly $H_2S$, dissolved in the solvent are stripped by being heated with a reboiler 109. The stripped $H_2S$ is exhausted from the top of the acidic gas stripping tower 106, passes through a condenser 107, and is eventually exhausted as acidic gas. In the heat exchanger 103, the solvent regenerated by the release of acidic gases heats the solvent from the acidic gas absorption tower 101, and supplied, through a pump 102f and a cooler 110d, into the acidic gas absorption tower 101, where the solvent is reused.

In the condenser 107, water contained in the acidic gas is condensed and removed. The condensed liquid is sent back to the acidic gas stripping tower 106 through a drum 108 and a pump 102c.

The solvent absorption tower 306 removes the solvent contained in crude gas exhausted from the acidic gas absorption tower 101. In the solvent absorption tower 306, the solvent is absorbed by water. This prevents the solvent of physical absorption used in the acidic gas absorption tower 101 from being mixed with a solvent of chemical absorption used in the $CO_2$ absorption tower 208 provided downstream. Drain water discharged from the bottom of the solvent absorption tower 306 is circulated back to the solvent absorption tower 306 through a pump 304b. Additionally, a small amount of feed water is supplied into the solvent absorption tower 306. Also, the drain water can be sent to the acidic gas absorption tower 101 by the pump 304b. The crude gas exhausted from the solvent absorption tower 306 is heated by a heat exchanger 301d, and is introduced into the $CO_2$ absorption tower 208 through a flash drum 302b.

The heat exchanger 301d heats gas exhausted from the solvent absorption tower 306 by utilizing heat of the gas after the shift reaction, in order that the crude gas may have a water saturation temperature that is suitable for the chemical absorption in the $CO_2$ absorption tower 208. In other words, the heat exchanger 301b and the heat exchanger 301d together represent a single heat exchanger. At this time, the crude gas heated by the heat exchanger 301d has preferably a pressure of 20 atm to 50 atm, and has preferably a temperature of 60° C. to 80° C., more preferably a temperature of 65° C. to 75° C., and most preferably of 70° C.

As for conventional heat recovery from the gas cooled to 125° C. to 135° C. by the heat exchanger 301a, the heat is used to heat boiler feed water (BFW) or cooled by an air fin cooler and wasted in a case where the heat cannot be used for heating BFW. However, as described above, according to the present invention, the heat can be used to heat the crude gas exhausted from the solvent absorption tower 306.

Also, the heat exchanger may be provided at the position of the heat exchanger 301c in the water circulating line to the solvent absorption tower 306 so as to raise the temperature of circulating water. Also, the heat exchanger 301d and the heat exchanger 301c may both be provided. The crude gas heated by the heat exchanger is humidified by make-up water or the like.

Into the $CO_2$ absorption tower 208, the crude gas from which excess water has been removed in the flash drum 302b is introduced. The $CO_2$ absorption tower 208 removes $CO_2$ by the contact of the introduced crude gas with a solvent. Purified gas from which $CO_2$ has been removed in the $CO_2$ absorption tower 208 is exhausted from the top of the $CO_2$ absorption tower 208. The solvent having absorbed $CO_2$ is discharged from the bottom of the $CO_2$ absorption tower 208, and sent to the high pressure flash drum 209. As the solvent used for the $CO_2$ absorption, a solvent for chemical absorption, such as an alkylamine, is preferable. Also, the crude gas in the $CO_2$ absorption tower 208 has preferably a pressure of 20 atm to 50 atm, and has preferably a tower top temperature of 40° C. to 60° C., which is suitable for $CO_2$ absorption, more preferably a temperature of 45° C. to 55° C., and most preferably of 50° C.

The high pressure flash drum 209 strips, by flash, physically solved gases such as $H_2$ and CO dissolved in the solvent. The gases such as $H_2$ and CO are sent back to the $CO_2$ absorption tower 208 through a compressor 213. The solvent from which the physically solved gases have been stripped is discharged from the bottom of the high pressure flash drum 209, and sent to the $CO_2$ stripping tower 210.

The $CO_2$ stripping tower 210 flashes the solvent sent from the high pressure flash drum 209, and releases $CO_2$ from the top of the $CO_2$ stripping tower 210. The released $CO_2$ is exhausted through a condenser 205b. In the condenser 205b, water and the like contained in $CO_2$ are removed. The condensed liquid is sent back to the $CO_2$ stripping tower 210 through a drum 206b and a pump 202c.

Most of the solvent from which $CO_2$ has been stripped in the $CO_2$ stripping tower 210 is returned as a semi-lean solvent by a pump 202d to the $CO_2$ absorption tower 208, and is reused. The rest of the solvent, after passing through a pump 202e and a heat exchanger 212a, is introduced into the solvent regeneration tower 211. In the heat exchanger 212a, the solvent from the $CO_2$ stripping tower 210 is heated in heat exchange by the solvent discharged from the solvent regeneration tower 211, and is completely regenerated in the solvent regeneration tower 211.

In the solvent regeneration tower 211, the solvent and the absorbed gas are separated from each other by being heated by a reboiler 207b to regenerate the solvent. The gas stripped in the solvent regeneration tower 211 is sent to the $CO_2$ stripping tower 210 located thereabove. The solvent regenerated in the solvent regeneration tower 211 is discharged, as a lean solvent, from the bottom of the solvent regeneration tower 211. The solvent, after being cooled by a heat exchanger 212b, is sent by a pump 202f to the $CO_2$ absorption tower 208, and is reused.

As described above, according to the present invention, since the crude gas is introduced into the CO shift reactor 3 before the $H_2S$ removal, highly active catalysts based on Co/Mo and the like can be used Accordingly, CO in the crude gas can be converted into $CO_2$ by the shift reaction using a small amount of steam. Thereafter, the crude gas is introduced into the $H_2S$ removal means 4, where $H_2S$ in the crude gas is removed by the solvent of physical absorption. In this way, the acidic gas separation apparatus of the present invention is capable of separating and removing $H_2S$ by the solvent of physical absorption, thereby making it possible to reduce $CO_2$ accompanying the $H_2S$ removal.

The crude gas after the $H_2S$ removal is introduced into the solvent absorption tower 306, and the solvent of physical absorption contained in the crude gas is removed. This prevents the solvent of physical absorption from being mixed with the solvent of chemical absorption used in the $CO_2$ removal means 5 provided downstream of the solvent absorption tower 306. The crude gas from which the solvent has been removed in the solvent absorption tower 306 is next heated by the heat exchanger 301d, and introduced into the $CO_2$ removal means 5. As the heat required by the heat exchanger 301d, heat of the crude gas after the shift reaction, which is conventionally wasted, is used. In the $CO_2$ removal means 5, $CO_2$ in the crude gas is separated and removed by the solvent of chemical absorption, and purified gas is exhausted. In this way, $CO_2$ removal from the crude gas is performed by chemical absorption, making it possible to eliminate the need for a chiller for cooling the solvent to a low temperature, and to reduce the compressor power to a large extent.

What is claimed is:

1. An apparatus for separating acidic gases of $CO_2$ and $H_2S$ from syngas containing the acidic gases, the apparatus comprising:
   shift reaction means for converting CO in the syngas into $CO_2$;
   physical absorption means for removing, by using a solvent for physical absorption, $H_2S$ contained in the syngas from the shift reaction means;
   chemical absorption means for removing, by using a solvent for chemical absorption, $CO_2$ from the syngas from which $H_2S$ has been removed by the physical absorption means;

washing means for washing the syngas after the shift reaction, the washing means being provided upstream of the physical absorption means;

solvent removal means for removing the solvent of physical absorption from the syngas from which $H_2S$ has been removed by the physical absorption means, the solvent removal means being provided upstream of the chemical absorption means; and heat exchange means for heating the syngas after the solvent removal means and before introduction into the chemical absorption means by use of the crude syngas heat before the introduction into the physical absorption means after the shift reaction means.

2. The apparatus according to claim 1, wherein the solvent for physical absorption is a solvent containing a mixture solution of dimethyl ether and a polyethylene glycol, and wherein the solvent for chemical absorption is a solvent containing an alkylamine.

3. The apparatus according to claim 1, wherein the shift reaction means is a sulfur-containing shift reactor using a catalyst based on Co/Mo.

4. A system for purifying coal gasification gas, comprising:

a gasifier for producing syngas from coal;

a scrubber for removing a hazardous substance in the syngas; and the separation apparatus according to claim 1, for separating acidic gases from the syngas after the removal of the hazardous substance.

* * * * *